Oct. 15, 1946.　　　J. J. KAPLAN　　　2,409,358
AUTOMATIC RECORDING APPARATUS
Filed Sept. 12, 1942　　　2 Sheets-Sheet 1
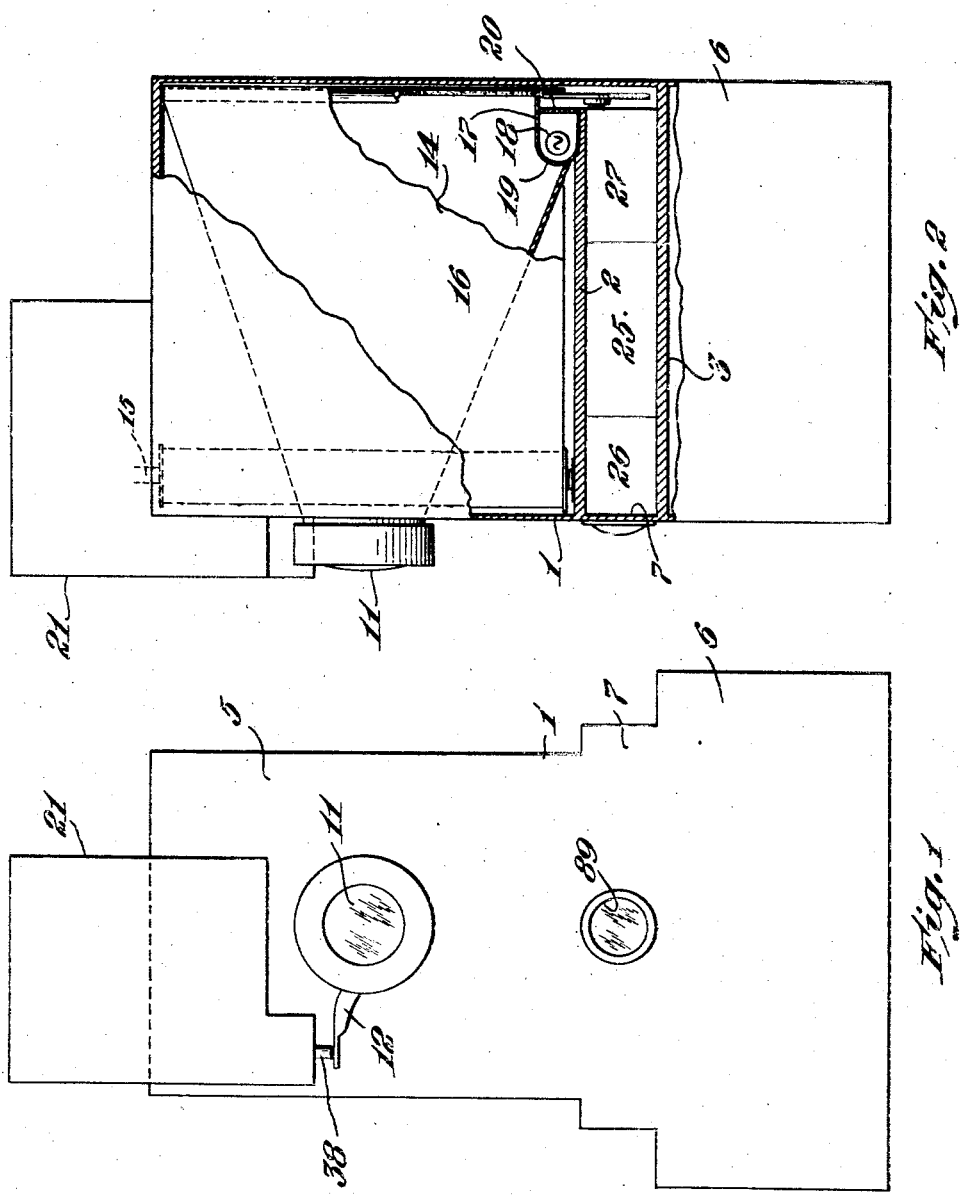
Inventor
Jacob J. Kaplan
By Roberts, Cushman & Woodbury
Att'ys Oct. 15, 1946.   J. J. KAPLAN   2,409,358
AUTOMATIC RECORDING APPARATUS
Filed Sept. 12, 1942   2 Sheets-Sheet 2

Inventor
Jacob J. Kaplan
by Roberts, Cushman & Woodberry
Att'ys.

Patented Oct. 15, 1946

2,409,358

UNITED STATES PATENT OFFICE 2,409,358

AUTOMATIC RECORDING APPARATUS

Jacob J. Kaplan, Boston, Mass.

Application September 12, 1942, Serial No. 458,116

15 Claims. (Cl. 88—16)

This invention relates to an apparatus for automatically recording visual conditions at a predetermined time, and is herein described with particular reference to its use for recording the attendance at a moving picture theater or other auditorium.

Exhibitors of motion pictures are often licensed by the distributor to exhibit pictures for a rental based on a percentage of the gross receipts, and in order to determine the amount of such receipts the distributor customarily relies upon either a report made by the exhibitor unchecked by any outside agency, or a report made by a representative of an agency independent of the exhibitor, this representative being called a "checker." Each of these methods is generally unsatisfactory, the former being unfortunately subject to manipulation and falsification, and the latter, while less subject to falsification, is not wholly free from this defect and is expensive in that it involves a substantial expenditure for the compensation and expenses of the checker.

The principal object of the present invention is to provide an apparatus for automatically recording visual conditions such as the attendance at an auditorium at one or more predetermined times throughout a specified period, which apparatus is reliable in operation and not subject to tampering.

A further object is to provide an apparatus of the above type in the form of a compact unit capable of being readily moved from place to place and conveniently set up for operation.

Further objects relate to various features of construction and will be apparent from a consideration of the following description and the accompanying drawings, wherein Fig. 1 is a front elevation of an apparatus constructed in accordance with the present invention;

Fig. 2 is a side elevation with parts broken away and shown in section;

Figure 3:
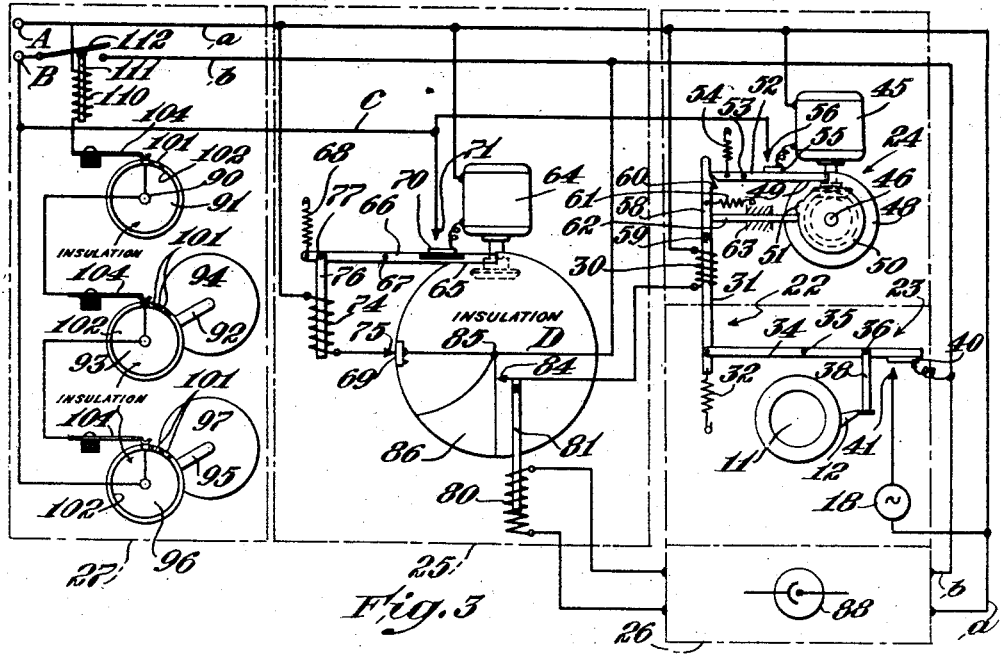
Fig. 3 is a schematic view of the operative parts of the apparatus.

In accordance with the present invention the recording apparatus comprises a camera equipped with a suitable lens and length of film for taking one or more photographs of an auditorium under varying light intensities, a shutter actuating mechanism capable of being operated so as to produce an exposure which may be varied from a fraction of a second to several seconds or more, and means such as an electric motor, spring wound motor, or the like for winding up the exposed film.

The shutter is preferably operated by electrical means such as a solenoid, and the operation of the shutter actuator is controlled by means which includes a clock mechanism designed to effect the operation of the shutter actuator only at predetermined intervals during a given period and a photoelectric device which is responsive to the intensity of the incident light so as automatically to vary the exposure, i. e. either the period of exposure or the diaphragm opening, during the recording interval. Thus, a photographic record may be automatically made at any desired time and with an exposure governed by the intensity of the incident light. Although a clear photographic record of the auditorium is desirable, it is to be understood that for the purpose of recording the attendance it is merely necessary that the photograph be sufficiently distinct to produce relatively light spots representing the faces of those present.

The operation of the film winding mechanism is preferably controlled by the shutter actuator so as to operate after the closing movement of the shutter to wind up the exposed film and thereupon present an unexposed part of the film for the succeeding record.

If desired the photographic record may also include such supplementary data as the time (day and hour) when the photograph was taken, along with the name of the theater, specified date of exhibition, camera number, distributor, etc. To this end the camera may be provided with a compartment into which a portion of the film projects, this compartment having a data card and time indicating details operated by the clock mechanism. In order to secure the desired illumination for recording the supplementary data there is provided an electric lamp which is lighted momentarily only during the interval when the shutter is open.

Although the different actuating mechanisms may be operated by any suitable electric or mechanical motors, the timing device, shutter actuator and associated parts are preferably electrically operated, and although the power source may be the usual light circuit to which the apparatus may be connected, the use of a battery carried in a compartment constituting a part of the apparatus is preferred, so that the operation may be independent of any outside agency, thus overcoming the possibility of tampering with accessible electric connections. The clock mechanism may also be electrically operated, although I prefer to use a spring wound clock and thus avoid a constant drain on the battery.

Where, as is preferred, the entire apparatus is a self-contained unit comprising sealed compartments for the battery, actuating mechanisms, etc., it may readily be carried from place to place and conveniently mounted in operative position with the timing mechanism set to effect operation of the camera at predetermined intervals during a specified period. The camera may be filled with a suitable length of film which, after a series of exposures, may be removed for development and replaced by a new film.

Referring to the drawings the embodiment shown therein comprises a housing 1 provided with spaced horizontal partitions 2 and 3 which divide the interior into an upper recording compartment 5, a lower battery compartment 6 and an intermediate compartment 7. The front walls of the recording and intermediate compartments are formed with central openings to accommodate the lens of the camera and a photocell, hereinafter more fully described. These compartments may be provided with doors or the like by means of which access to their respective interiors may be had.

The recording compartment is substantially lightproof and has a built-in camera which may be of conventional design and construction, having the usual lens 11, shutter and associated operating lever 12 which controls the period of exposure of film 14 which is mounted on rollers and is suitably shielded in the customary manner. One of the film-supporting rollers is mounted on a film-winding spingle 15 which, when rotated, winds up the film so as to carry the exposed portion from the exposure chamber 16 and simultaneously present an unexposed portion.

The major portion of the film 14 extends through the main exposure chamber 16 and a partition 17 defines a sub-chamber through which only the lower marginal portion of the film extends, as shown in Fig. 2. Mounted within the sub-chamber is an elongate electric lamp 18, horizontally disposed in spaced parallel relation with the lower margin of film 14. Associated with the lamp 18 is a reflector 19 which may be integral with partition 17, and a screen or filter 20 having optical characteristics suitable to produce the desired exposure on the adjacent area of film 14. It is to be understood that the partition 17 thoroughly shields the lamp 18 so that there is no leakage of light into the main exposure chamber.

A generally L-shaped casing 21 is mounted on the front and top walls of housing 1 and within this casing a shutter-operating mechanism 22, associated lamp switch 23 and film-winding mechanism 24 are suitably mounted. The operation of these mechanisms is under the conjoint control of a timing mechanism 25, photoelectric device 26 and clock mechanism 27, all of which are mounted in the intermediate compartment 7, as indicated in Fig. 2. The electrically operated elements of these mechanisms are connected to power supply lines a, b which lead to the battery compartment 6 and in which is mounted either a storage battery or a plurality of dry cells.

Referring to Fig. 3 which schematically illustrates the aforementioned mechanisms, the shutter actuator 22 comprises a solenoid 30 associated with an elongate armature or plunger 31 which is normally held in retracted position by a tension spring 32. One end of the plunger is pivotally connected with one arm of a lever 34 which is pivoted at 35, and the other arm of the lever is pivotally connected at 36 to a depending actuator rod 38 (see also Fig. 1) engageable with the operating lever 12 of the shutter. The free end of this lever arm also carries a contact 40 which is connected to power supply line b and normally held spaced from its companion contact which is connected in series with lamp 18 and to the other power line a. When the solenoid 30 is energized the plunger 31 is advanced and causes the shutter lever to be depressed, thereby opening the shutter, and simultaneously closing contacts 40 and 41, thereby closing the circuit through the lamp 18. When the solenoid 30 is de-energized the parts are restored to their normal positions by spring 32, thus permitting the shutter to close and breaking the circuit through the lamp 18.

The film winding mechanism 24 comprises an electric motor 45 connected through suitable gearing to a small shaft 46 which in turn is connected through suitable gearing to the projecting end of the film-winding spindle 15, it being understood that the gear ratio is such that one revolution of the shaft 46 is sufficient to rotate spindle 15 so as to wind up the exposed film and bring in position for exposure a succeeding area of the film. The construction and arrangement of parts are such that the time interval required for one revolution of the shaft 46 is of the order of one-half minute, although a greater or lesser interval would be permissible, depending upon the period of operation of the associated timer 25 and the clock mechanism 27.

The shaft 46 carries a disk 48 formed with a notch 49 and a cam 50 formed with a rise element 51. A lever 52, pivoted at 53, is formed with a pawl-like end which is normally held in notch 49 by a small tension spring 54, thus providing in effect pawl and ratchet elements operative normally to hold the disk and associated parts locked against rotation. The lever arm also carries a contact 55 which is connected to supply line a through the motor 45 and normally held spaced from its companion contact 56 which is connected by line c to terminal B. The opposite arm of lever 52 is operatively associated with a pull bar 58 which is pivotally connected at 59 with the plunger 31. The pull bar 58 is formed with a ratchet-like tooth 60 engageable with the adjacent end of lever 52 and is normally held in operative position by a small tension spring 61. One end of a follower 62, slidably mounted in guideways 63, is arranged so as normally to engage the dwell surface of cam 50 and its other end is engageable with the intermediate portion of the pull bar 58. The construction and arrangement of parts are such that when the solenoid 30 is energized the plunger 31 and pull bar 58 are advanced so that the tooth 60 rides over and beyond the end of lever 52, the spring 61 being operative to hold the pull bar in engagement with the end of lever 52; and when the solenoid is de-energized the plunger 31 and pull bar 58 are retracted by spring 32, thereby causing the tooth 60 to pull the adjacent arm of lever 52 downwardly and raise the opposite arm upwardly, thus disengaging its pawl-like end from notch 49 and simultaneously closing the circuit through motor 45 and contacts 55, 56, whereupon the motor 45 operates to rotate shaft 46 in a counterclockwise direction. As the shaft 46 and associated parts rotate, the rise 51 of cam 50 throws the follower 62 outwardly against pull bar 58 sufficiently to effect disengagement of the tooth 60 from the end of lever 52, whereupon lever 52 drops downwardly and rides on the periphery of disk 48, in which position the lever 52 is effective to maintain contacts 55, 56 closed. The shaft 46 continues its rotation until the notch 49 is about to complete one revolution at which time the end of lever arm 52 drops into the notch 49, thus breaking the circuit through contacts 55, 56 to shut off the motor, and further revolution of the disk 48 is arrested by the engagement of the end of lever arm with the wall of notch 49, thus terminating the film winding cycle.

The period during which the solenoid 30 is energized and hence the period of exposure is controlled by the timing mechanism 25 and the associated photoelectric device 26. The timing mechanism comprises a rotatable disk D of insulating material which carries a contact element 69 on its periphery and a segment-shaped contact plate 86 on one face. An electric motor 64 is connected through suitable gearing so as to rotate the disk D in a counterclockwise direction, the design of the gearing being such that it requires at least one minute for the disk D to make one complete revolution. The periphery of the disk D is formed with a notch 65 which receives the pawl-like end of a lever 66 pivotally mounted at 67. A small tension spring 68 acting on the opposite end of the lever normally holds its pawl-like end in locking engagement with the notch 65, thus providing in effect pawl and ratchet elements adapted to operate in a manner similar to the corresponding elements of the film winding mechanism. The lever arm 66 also carries a contact 70 which is connected to line $a$ through the motor 64 and normally held spaced from its companion contact 71 which is connected by line $c$ with terminal B. A solenoid 74 is connected with line $a$ and with a fixed contact 75 engageable with contact 69. A plunger 76 associated with solenoid 74 has a pin and slot connection 77 with the lever 66, the spring 68 being effective normally to hold the plunger in retracted position.

Mounted above the disk D is a contact-adjusting device comprising a solenoid 80 and associated plunger 81 mounted for movement in a line parallel to the plane of the surface of disk D and approximately radially thereof. The end of plunger 81 carries a brush contact 84 engageable with the contact plate 86. The contact 84 is connected in series with solenoid 30 and line $a$, whereas the contact plate 86 has a common connection with contact 69 at 85 which in turn is connected with line $b$. The construction and arrangement of parts are such that with the lever 66 in locking position contacts 69 and 75 are in engagement, but contacts 84 and 86 remain out of engagement until motor 64 has come up to speed so as to rotate disk D at a substantially uniform rate. The arrangement of the contact-adjusting device is such that the brush contact 84 moves radially of the disk D so as to engage the contact plate 86 along a circumferential line which varies in accordance with the radial setting of the plunger, and the design of the solenoid and plunger is such that the position of the latter corresponds with the current flowing through the solenoid. Hence, by varying the impedance of the solenoid circuit the position of the plunger may be adjusted correspondingly and for a given speed of rotation of the disk D and a fixed setting of the plunger and associated contact 84 the circuit through the shutter actuating solenoid 30 may be closed for a definite interval.

When the solenoid 74 is energized the plunger 76 is pulled inwardly, thus swinging the free end of the lever 66 outwardly to disengage its end from notch 65 and simultaneously to close contacts 70, 71, thereby starting motor 64 which rotates the disk D in a counterclockwise direction. As the disk D rotates the contacts 69, 75 disengage thus breaking the circuit through solenoid 74, but as the end of lever 66 rides on the periphery of disk D contacts 70, 71 are maintained closed, thus effecting continued rotation of the disk until one complete revolution has been made at which time the end of the lever arm 66 drops into the notch 65 to break the circuit through contacts 70, 71 and motor 64 and arrest further rotation of disk D. During rotation of the disk D the brush contact 84 engages the plate contact 86, thereby establishing a closed circuit through the shutter actuating solenoid 30 for an interval the duration of which is dependent upon the setting of the plunger 81.

The position of the plunger 81 is controlled by the photoelectric device 26 which comprises a conventional electronic control circuit including the solenoid 80, a photocell 88 and, if desired, amplifier tubes (not shown). The photocell 88 is operatively positioned with respect to the opening 89 (Fig. 1) in the front wall of compartment 7 and is connected in the electronic circuit to respond to changes in intensity of incident light so as correspondingly to vary the impedance of the solenoid circuit. Inasmuch as the design of such an electronic control circuit is well known to those skilled in the art further explanation is unnecessary.

When the incident light is of maximum intensity (i. e., full illumination of the auditorium), the impedance of the control circuit is minimum and the plunger 81 is held in its innermost position, whereas at minimum intensity (i. e., when the auditorium is as dark as it usually becomes during the normal operation, as distinguished from a complete blackout) the impedance is maximum and the plunger 81 is held in its outermost position. Since the photoelectric device 26 is at all times connected to power lines $a$ and $b$, the control circuit remains operative as long as the supply lines are connected to the battery and hence the timing mechanism 25 and shutter actuating mechanism 22 are always subject to the control of photocell 88.

Figure 4:
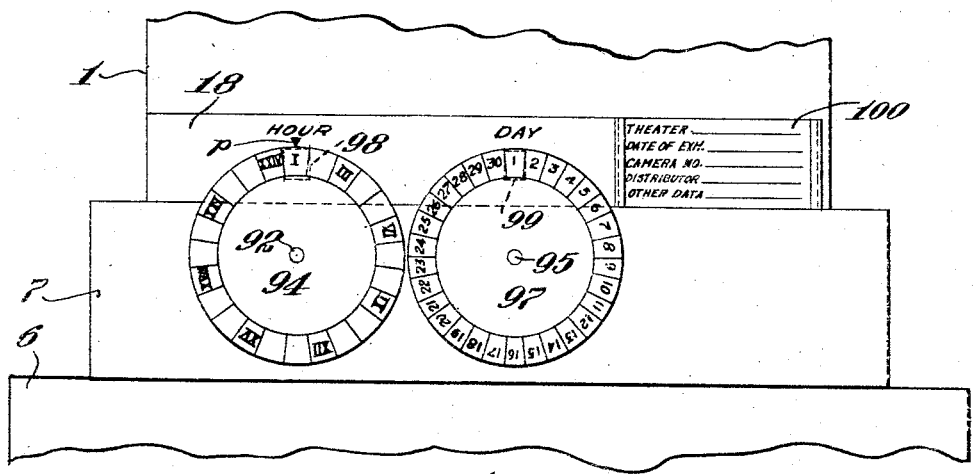
Fig. 4 is an enlarged fragmentary elevation showing the arrangement of the time dials and data card.

The clock mechanism 27 which has primary control over all the above-described mechanisms comprises a conventional spring wound clock (preferably of the ten or fifteen day type) and its minute-hand arbor 90 (rotating at a rate of one revolution per hour) carries a disk 91, its hour hand arbor 92 (rotating at the rate of one revolution per twenty-four hours) carries a disk 93 and also a dial 94 marked off into twenty-four segments numbered from I to XXIV, as shown in Fig. 4. An arbor 95 is suitably geared to the arbor 92 so as to make one complete revolution every thirty days and this arbor carries a disk 96 and a dial 97 which is marked off into thirty segments numbered from 1 to 30 (Fig. 4). The upper parts of the dials 94, 97 extend through an opening at the rear end of partition 2 into the sub-chamber in close juxtaposition to the film 14, as shown in Fig. 2. In this position the uppermost numerals of the dials 94 and 97 are in direct line of light passing through the screen 20 and in order to produce an indisputable record the screen 20 may be masked off or otherwise rendered opaque except for rectangular openings shown by the dotted lines 98 and 99 of Fig. 4, these openings being coextensive with the numbered sections of the dials so as to confine the exposure of the film to that of the area of the openings 98 and 99. If desired, the screen 20 may be provided with a pointer $p$ and lettering indicating that the dial 94 shows the time of the day (exact hour and approximate minutes) and the dial 97 shows the day when the exposure was made. In addition to these data the screen 20 may be provided with a translucent area to receive a replaceable data card 100 formed of transparent material with opaque lettering, as shown in Fig. 4.

Each of the disks of the clock may be formed with a plurality of recesses or the like capable of receiving removable contacts 101 which may be adjusted in a manner hereinafter explained. The contacts 101 carried by the disk are connected to a ring or the like conductor 102 and for each disk there is provided a leaf spring contact 104 engageable with the contacts 101. The arrangement of the contacts 101 on disk 91 is preferably such that in the course of normal rotation of disk 91 the contacts 101 and 104 are in engagement for a period of one minute or less, although if desired contacts 101 may be so arranged as to engage contact 104 at any desired interval or intervals of predetermined duration. Similarly with disk 93 except that the contacts are preferably arranged to engage the spring contact 104 throughout a predetermined period during one revolution; and likewise with the contacts 101 of disk 96 which may be arranged to engage contact 104 throughout certain specified days.

The conductor 102 of disk 96 is connected to terminal B and its spring contact 104 is connected to conductor 102 of disk 93 and contact 104 of the latter is likewise connected to conductor 102 of disk 91. Contact 104 of disk 91 is connected through a solenoid 110 with supply line $a$, thus connecting all contacts in series with solenoid 110. The solenoid 110 is associated with an armature or plunger 111 which is operatively connected with a normally open switch 112 cut into power line $b$ on one side of terminal B. The terminals A and B are directly connected with the battery (not shown) located in compartment 6.

With the construction and arrangement above described the solenoid 110 may be energized to close switch 112 only when contacts 101 and 104 of each of the disks 91, 93 and 96 are closed and the timing mechanism 25, shutter actuating mechanism 22, film-winding mechanism 24 and photoelectric device 26 can only operate when the switch 112 closes line $b$. By properly arranging the romavble contacts 101 of each of the disks 91, 93 and 96, the circuit through solenoid 110 can be closed for one or more predetermined periods during one or more selected hours throughout one or more selected days during the month and hence any desired number of photographic records may be automatically made at any time during a specified period, as explained in the following summary of operation.

Let it be assumed, for example, that a record of attendance at a theater is to be made on the first, second and third days of a certain month; that the theater opens at twelve noon; and that the exhibition is to be repeated every three hours, the last show commencing at 9:00 p. m. Under these conditions the distributor of the motion picture play would arrange contacts 101 in disk 96 to correspond with the dates 1, 2 and 3 on dial 97, removing all other contacts; contacts 101 in disk 93 would be arranged to correspond with the hours from XII to XXII on dial 94, and all other contacts would be removed; and contacts 101 would be arranged in disk 91 so as to close the circuit for a period not exceeding one minute once during every hour commencing at about 1:00 p. m. and continuing through 10:00 p. m. Accordingly, on the first, second and third days of the month between the hours of 12:00 noon and 11:00 p. m. the apparatus is set up to make photographic records of the attendance once each hour. In addition the data card 100 would be filled in appropriately and inserted in place.

With the camera loaded with film, the contacts arranged as above described and the clock mechanism 27 wound up, the apparatus is then ready for installation in the auditorium of the theater, it being understood that the aforementioned adjustments and the installation may be made several days prior to the date of the first exhibition since the clock mechanism is effective to maintain an open circuit until the specified time is at hand. At about 1:00 p. m. on the first day the contacts 101 and 104 of disks 91, 93 and 96 establish a closed circuit through solenoid 110 which acts to close supply lines $a$, $b$ for a period of one minute. Upon closing the switch 112 the circuit through solenoid 74 is established whereupon lever 66 operates to close the circuit through motor 64 which rotates the timing disk D. Simultaneously the circuit through photocell 88 is established and the solenoid 80 acts to position the contact 84 in accordance with the intensity of light on the photocell. As the timing device rotates contacts 69 and 75 are broken, but the circuit through motor 64 is maintained and when the motor is up to speed the contact plate 86 is brought into engagement with contact 84 to establish a closed circuit through solenoid 30. The solenoid 30 not only actuates the shutter lever 12 and closes the circuit through lamp 18 but also positions pull bar 58 to operate lever 52. Continuous rotation of the timing disk D breaks contacts 86 and 84, thus deenergizing solenoid 30 whereupon spring 32 retracts plunger 31, thus breaking the circuit through lamp 18, releasing the shutter lever 12 and closing the circuit through motor 45. By this time a photograph has been taken at the proper exposure and as the circuit through motor 45 is now established, the disk 48 and cam 50 rotate and the exposed portion of the film 14 is wound up and an unexposed portion presented for the next exposure. Rotation is continued until one revolution has been completed after which the disk 48 is locked by lever 52.

The cycles thus described take place in the interval during which the switch 112 remains closed, but if it should happen that the switch 112 open up prior to the expiration of the time necessary for the timing disk D and control disk 43 to complete one revolution, the motors 45 and 64 will nevertheless continue to operate since they are not under the direct control of switch 112, and hence the parts are automatically restored to normal position notwithstanding a shortened timing interval.

When the disk 91 breaks the contacts 101, 104 switch 112 opens lines $a$, $b$, and these lines remain open until contacts 101, 104 of disk 91 again close the circuit through solenoid 110 which, as above pointed out, occurs once each hour, whereupon the operating cycle is repeated throughout each of the selected periods during each of the specified days. Each operating cycle produces an exposure which, when developed, provides a record of attendance, supplemented by the data appearing on card 100 and dials 94 and 97. The record thus produced provides indisputable proof of the month, day and hour when the photograph was made and by counting the attendance shown by the photograph an accurate record is obtained.

If it be desired to take check records hourly, rather than a single record, the contacts 101 of disk 91 may be set accordingly, or the contacts 101 may be such as to hold the circuit through solenoid 110 closed for a period of two minutes, in which case the circuit through solenoid 74 is re-established at the end of the first operating cycle and thus effective to cause a repeat cycle. By properly arranging the contacts 101 of disks 91, 93 and 96, any number of records may be made throughout any specified period.

While I have shown and described one desirable embodiment of the invention it is to be understood that this disclosure is for the purpose of illustration and that various changes in design and arrangement of parts, as well as the substitution of equivalent elements for those herein shown and described, may be made without departing from the spirit and scope of the invention as set forth in the appended claims.

I claim:

1. Recording apparatus comprising a camera having a shutter for controlling the period of exposure, actuating means including a solenoid for opening and closing said shutter, the shutter being closed so long as the solenoid remains deenergized and being open so long as the solenoid is energized, timing mechanism including relatively movable contacts electrically connected with said solenoid for controlling the operation of said shutter, photoelectric means controlling the relative position of said contacts so as to vary the period of energization of said solenoid and thereby vary the duration of exposure in accordance with the intensity of incident light, power supply lines connected with said solenoid and contacts, a control switch for said power supply lines, and a clock mechanism for operating said switch at predetermined times during a specified period.

2. Recording apparatus comprising a camera having a shutter for controlling the period of exposure, actuating means including a solenoid for opening and closing said shutter, the shutter being closed so long as the solenoid remains deenergized and being open so long the the solenoid is energized, power supply lines connected with said solenoid, photoelectric means connected to said power supply lines and operative to control the duration of the period of energization of said solenoid so as to vary the exposure in accordance with the intensity of incident light, a control switch for said power supply lines, and a clock mechanism for operating said switch at predetermined times during a specified period.

3. Recording apparatus comprising a camera having a shutter for controlling the period of exposure, actuating means including a solenoid for opening and closing said shutter, the shutter being closed so long as the solenoid remains deenergized and being open so long as the solenoid is energized, timing mechanism including relatively movable contacts electrically connected with said solenoid for controlling the operation of said shutter, photoelectric means controlling the relative position of said contacts so as to vary the period of energization of said solenoid and thereby vary the duration of exposure in accordance with the intensity of incident light, power supply lines connected with said solenoid and contacts, a control switch for said power supply lines, a clock mechanism for operating said switch at predetermined times, and film winding mechanism operative only after closing movement of said shutter for winding up the exposed film.

4. Recording apparatus comprising a camera having a shutter for controlling the period of exposure, actuating means including a solenoid for opening and closing said shutter, the shutter being closed so long as the solenoid remains deenergized and being open so long as the solenoid is energized, timing mechanism including relatively movable contacts electrically connected with said solenoid for controlling the operation of said shutter, power supply lines connected with said solenoid and contacts, photoelectric means connected to said power supply lines and with said timing mechanism for adjusting said contacts so as to vary the period of energization of said solenoid and thereby vary the duration of shutter opening in accordance with the intensity of incident light, a control switch for said power supply lines, a clock mechanism for operating said switch at predetermined times, and film winding mechanism operative only after closing movement of said shutter for winding up the exposed film.

5. Recording apparatus comprising a housing having partitions defining a recording compartment, a battery compartment and an intermediate compartment having an opening, a camera built into said recording compartment, said camera having a shutter for controlling the period of exposure, shutter actuating means mounted on said housing adjacent to said shutter, said shutter actuating means including a solenoid, the shutter being closed so long as the solenoid remains deenergized and being open so long as the solenoid is energized, timing mechanism located in said intermediate compartment, said timing mechanism including adjustable, relatively movable contacts electrically connected with said solenoid and effective to control the energization of the solenoid, power supply lines leading from said battery compartment and connected with said solenoid and contacts, photoelectric means located in said intermediate compartment in light-receiving position with respect to the opening therein, said photoelectric means being connected with said power supply lines and with said timing mechanism and being operative to adjust said contacts so as to vary the period of energization of said solenoid and thereby effect a variation in the duration of shutter opening in accordance with the intensity of incident light, and a clock mechanism and associated power control switch located in said intermediate compartment, said control switch being connected with said power supply lines and actuated by said clock mechanism so as to close the circuit through said solenoid at a predetermined time.

6. Recording apparatus comprising a housing having partitions defining a recording compartment, a battery compartment and an intermediate compartment, a camera built into said recording compartment, said camera having a shutter for controlling the period of exposure, shutter actuating means mounted on said housing adjacent to said shutter, said shutter actuating means including a solenoid, the shutter being closed so long as the solenoid remains deenergized and being open so long as the solenoid is energized, timing mechanism located in said intermediate compartment, said timing mechanism including relatively movable contacts electrically connected with said solenoid and photoelectric means for controlling the position of said contacts in accordance with the intensity of incident light so as to control the energization of the solenoid and thereby the duration of opening of said shutter, power supply lines leading from said battery compartment and connected with said solenoid and contacts, film winding mechanism mounted on said housing and including a motor, a motor switch connected to said power supply lines, connections between said motor switch and shutter actuating mechanism effective to close said switch after closing movement of said shutter so as to wind up the exposed film, and a cluock mechanism and associated power control switch located in said intermediate compartment, said control switch being connected with said power supply lines and actuated by said clock mechanism so as to close the circuit through said solenoid at a predetermined time.

7. Recording apparatus comprising a housing having partitions defining a recording compartment, a battery compartment and an intermediate compartment having an opening, a camera built into said recording compartment, said camera having a shutter for controlling the period of exposure, shutter actuating means mounted on said housing adjacent to said shutter, said shutter actuating means including a solenoid, the shutter being closed so long as the solenoid remains deenergized and being open so long as the solenoid is energized, timing mechanism located in said intermediate compartment, said timing mechanism including adjustable, relatively movable contacts electrically connected with said solenoid and effective to control the energization of the solenoid and thereby the duration of opening of said shutter, power supply lines leading from said battery compartment and connected with said solenoid and contacts, photoelectric means located in said intermediate compartment in operative position with respect to the opening therein, said photoelectric means being connected with said power supply lines and with said timing mechanism and being operative to adjust said contacts so as to vary the period of energization of said solenoid and thereby effect a variation in the duration of shutter opening in accordance with the intensity of incident light, film winding mechanism mounted on said housing and including a motor, a motor switch connected to said power supply lines, connections between said switch and shutter actuating mechanism effective to close said switch after closing movement of said shutter so as to wind up the exposed film, and a clock mechanism and associated power control switch located in said intermediate compartment, said control switch being connected with said power supply lines and actuated by said clock mechanism so as to close the circuit through said solenoid at a predetermined time.

8. Recording apparatus comprising a camera having a main chamber provided with a lens and associated shutter for controlling the period of exposure, a secondary chamber juxtaposed to said main chamber and having an electric lamp therein, a single photographic film having its major portion within said main chamber and a minor portion extending into said secondary chamber, actuating means including a solenoid for opening and closing said shutter, the shutter being closed so long as the solenoid remains deenergized and being open so long as the solenoid is energized, an electric switch connected with said lamp and operated by said actuating means to turn said lamp on and off in response to opening and closing movement of said shutter, data-displaying means in said secondary chamber so positioned with respect to the film therein as to be photographically recorded when said lamp is turned on, and clock mechanism associated with said actuating means for effecting the operation of said actuating means to energize said solenoid and operate said switch at predetermined times during a specified period.

9. Recording apparatus comprising a camera having a main chamber provided with a lens and associated shutter for controlling the period of exposure, a secondary chamber juxtaposed to said main chamber and having an electric lamp therein, a single photographic film having its major portion within said main chamber and a minor portion extending into said secondary chamber, actuating means including a solenoid for opening and closing said shutter, the shutter being closed so long as the solenoid remains deenergized and being open so long as the solenoid is energized, an electric switch connected with said lamp and operated by said actuating means to turn said lamp on and off in response to opening and closing movement of said shutter, data-displaying means in said secondary chamber so positioned with respect to the film therein as to be photographically recorded when said lamp is turned on, clock means associated with said actuating means for effecting the operation of said actuating means to energize said solenoid and operate said switch at predetermined times, and photoelectric means associated with said actuating means so as to vary the period of energization of said solenoid and thereby vary the duration of shutter opening in accordance with the intensity of incident light.

10. Recording apparatus comprising a camera having a main chamber provided with a lens and associated shutter for controlling the period of exposure, a secondary chamber juxtaposed to said main chamber and having an electric lamp therein, a single photographic film having its major portion within said main chamber and a minor portion extending into said secondary chamber, actuating means including a solenoid for opening and closing said shutter, the shutter being closed so long as the solenoid remains deenergized and being open so long as the solenoid is energized, an electric switch connected with said lamp and operated by said actuating means to turn said lamp on and off in response to open- and closing movement of said shutter, data-displaying means in said secondary chamber so positioned with respect to the film therein as to be photographically recorded when said lamp is turned on, clock mechanism associated with said actuating means for effecting the operation of said actuating means to energize said solenoid and operate said switch at predetermined times, and film winding mechanism operative only after closing movement of said shutter for winding up the exposed film.

11. Recording apparatus comprising a camera having a main chamber provided with a lens and associated shutter for controlling the period of exposure, a secondary chamber juxtaposed to said main chamber and having an electric lamp therein, a single photographic film having its major portion within said main chamber and a minor portion extending into said secondary chamber, actuating means including a solenoid for opening and closing said shutter, the shutter being closed so long as the solenoid remains deenergized and being open so long as the solenoid is energized, an electric switch connected with said lamp and operated by said actuating means to turn said lamp on and off in response to opening and closing movement of said shutter, data-displaying means in said secondary chamber so positioned with respect to the film therein as to be photographically recorded when said lamp is turned on, clock mechanism associated with said actuating means for effecting the operation of said actuating means to energize said solenoid and operate said switch at predetermined times, photoelectric means associated with said actuating means so as to vary the period of energization of said solenoid and thereby vary the duration of shutter opening in accordance with the intensity of incident light, and film winding mechanism operative only after closing movement of said shutter for winding up the exposed film.

12. Recording apparatus comprising a camera having a main chamber provided with a lens and associated shutter for controlling the period of exposure, a secondary chamber juxtaposed to said main chamber and having an electric lamp therein, a single photographic film having its major portion within said main chamber and a minor portion extending into said secondary chamber, actuating means including a solenoid for opening and closing said shutter, the shutter being closed so long as the solenoid remains deenergized and being open so long as the solenoid is energized, timing mechanism including relatively movable contacts electrically connected with said solenoid for controlling the energization of said solenoid, power supply lines connected with said contacts and solenoid, a light switch connecting said lamp and power supply lines, connections between said light switch and actuating means operative to turn said lamp on and off in response to opening and closing movement of said shutter, data-displaying means in said secondary chamber so positioned with respect to the film therein as to be photographically recorded when said lamp is turned on, a control switch for said power supply lines, and clock mechanism for operating said control switch at predetermined times.

13. Recording apparatus comprising a camera having a main chamber provided with a lens and associated shutter for controlling the period of exposure, a secondary chamber juxtaposed to said main chamber and having an electric lamp therein, a single photographic film having its major portion within said main chamber and a minor portion extending into said secondary chamber, actuating means including a solenoid for opening and closing said shutter, the shutter being closed so long as the solenoid remains deenergized and being open so long as the solenoid is energized, timing mechanism including adjustable and relatively movable contacts electrically connected with said solenoid for controlling the energization of said solenoid, power supply lines connected with said contacts and solenoid, a switch associated with said actuating means and connecting said lamp and power lines so that said lamp is turned on and off in response to opening and closing movements of said shutter, data-displaying means in said secondary chamber so positioned with respect to the film therein as to be photographically recorded when said lamp is turned on, and photoelectric means connected with said power supply lines and timing mechanism, said photoelectric means being operative to adjust said contacts so as to vary the period of energization of said solenoid and thereby effect a variation in the duration of shutter opening in accordance with the intensity of incident light.

14. Recording apparatus comprising a camera having a main chamber provided with a lens and associated shutter for controlling the period of exposure, a secondary chamber juxtaposed to said main chamber and having an electric lamp therein, a single photographic film having its major portion within said main chamber and a minor portion extending into said secondary chamber, actuating means including a solenoid for opening and closing said shutter, the shutter being closed so long as the solenoid remains deenergized and being open so long as the solenoid is energized, timing mechanism including relatively movable contacts electrically connected with said solenoid for controlling the energization of said solenoid, power supply lines connected with said contacts and solenoid, a light switch connecting said lamp and power supply lines, connections between said light switch and actuating means operative to turn said lamp on and off in response to opening and closing movement of said shutter, data-displaying means in said secondary chamber so positioned with respect to the film therein as to be photographically recorded when said lamp is turned on, a control switch for said power supply lines, clock mechanism for operating said control switch at predetermined times, and film winding mechanism operative only after closing movement of said shutter for winding up the exposed film.

15. Recording apparatus comprising a camera having a main chamber provided with a lens and associated shutter for controlling the period of exposure, a secondary chamber juxtaposed to said main chamber and having an electric lamp therein, a single photographic film having its major portion within asid main chamber and a minor portion extending into said secondary chamber, actuating means including a solenoid for opening and closing said shutter, the shutter being closed so long as the solenoid remains deenergized and being open so long as the solenoid is energized, timing mechanism including adjustable, relatively movable contacts electrically connected with said solenoid for controlling the energization of asid solenoid, power supply lines connected with said contacts and solenoid, a switch associated with said actuating means and connecting said lamp and power lines so that said lamp is turned on and off in response to opening and closing movements of said shutter, data-displaying means in said secondary chamber so positioned with respect to the film therein as to be photographically recorded when said lamp is turned on, photoelectric means connected with said power supply lines and timing mechanism, said photoelectric means being operative to adjust said contacts so as to vary the period of energization of said solenoid and thereby effect a variation in the duration of shutter opening in accordance with the intensity of incident light, and film winding mechanism operative only after closing movement of said shutter for winding up the exposed film.

JACOB J. KAPLAN.